United States Patent
Notsu et al.

(10) Patent No.: US 6,884,199 B2
(45) Date of Patent: Apr. 26, 2005

(54) HYBRID VEHICLE SYSTEM

(75) Inventors: Ikurou Notsu, Ageo (JP); Akihito Okazaki, Ageo (JP); Masakazu Sasaki, Ageo (JP); Shougo Nishikawa, Ageo (JP); Mistuhiro Nishina, Ageo (JP); Hideaki Gouda, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 0 days.

(21) Appl. No.: 10/398,760

(22) PCT Filed: Mar. 30, 2001

(86) PCT No.: PCT/JP01/02824
§ 371 (c)(1),
(2), (4) Date: Apr. 10, 2003

(87) PCT Pub. No.: WO02/32711
PCT Pub. Date: Apr. 25, 2002

(65) Prior Publication Data
US 2004/0040810 A1 Mar. 4, 2004

(51) Int. Cl.[7] .............................. B60K 17/04; B60K 6/02
(52) U.S. Cl. .............................. 477/5; 74/339; 192/3.55
(58) Field of Search .............................. 477/5; 74/339; 180/65.2, 65.7; 192/3.54, 3.55, 3.56

(56) References Cited
U.S. PATENT DOCUMENTS 3,478,851 A * 11/1969 Smyth et al. .............. 192/3.55
5,337,848 A * 8/1994 Bader ......................... 180/65.2
5,993,350 A * 11/1999 Lawrie et al. .................. 477/5

FOREIGN PATENT DOCUMENTS

| JP | 03-113167 A | 5/1991 | |
|---|---|---|---|
| JP | 11-160759 A | 6/1999 | |
| JP | 2000-103259 A | 4/2000 | |
| JP | 2003-335152 A | * 11/2003 | ........... B60K/41/08 |

* cited by examiner

*Primary Examiner*—Richard M. Lorence
(74) *Attorney, Agent, or Firm*—Rabin & Berdo, P.C.

(57) ABSTRACT

This system comprises an engine 1, a transmission device 4, a clutch 3 for engaging/disengaging the engine 1 with/from the transmission device 4, a rotational electric device 2, a power transmission mechanism 5 for inputting the rotation of the rotational electric device 2 to the transmission device, and an accumulator element 7 for accumulating electrical power supplied by the rotational electric device 2. A control unit 20 determines a gear change instruction for the transmission device 4, and if gear change instruction is determined, it disengages the clutch 3, and controls the rotation of the rotational electric device 2 in such a manner that the rotational speed of the input shaft of the transmission device becomes a target rotational speed required for a gear changing operation.

3 Claims, 7 Drawing Sheets

MOTOR DRIVE

ENGINE DRIVE

ENGINE+
MOTOR DRIVE

MOTOR BRAKING
(REGENERATION)

MOTOR ELECTRICITY
GENERATION

ELECTRICITY GENERATION
DURING TRAVEL

HYBRID VEHICLE SYSTEM

TECHNICAL FIELD

This invention relates to a so-called parallel type hybrid system wherein an engine and a rotational electric motor (motor generator) are provided as power sources of a vehicle.

BACKGROUND ART

Japanese Patent Application No. H11-160759 discloses a parallel type hybrid system which comprises: an engine, a transmission device for changing the speed of rotation of an input shaft and transmitting said rotation to vehicle wheels via an output shaft, a clutch for engaging/ disengaging the output shaft of the engine with/from the input shaft of the transmission device, a rotational electric device serving as an electric motor and an electric generator, a power transmission mechanism for coupling the input and output shafts of the rotational electric device with the input shaft of the transmission device, and an accumulator element for accumulating electrical power supplied by the rotational electric device.

In prior applications of this kind, it can be seen that the friction and inertia of the rotational electric device acts via the power transmission mechanism on the input shaft of the transmission device, thereby placing a great load on the synchronous mechanism when changing gear, and increasing the gear changing time (synchronous time).

DISCLOSURE OF THE INVENTION

It is an object of the present invention to enable gear changing operations to be carried out smoothly and rapidly in the transmission device of a hybrid system.

The hybrid system for a vehicle according to the present invention comprises: an engine, a transmission device for gearing the speed of rotation of an input shaft and transmitting said rotation to vehicle wheels via an output shaft, a clutch for engaging/disengaging the output shaft of the engine with/from the input shaft of the transmission device, a rotational electric device serving as an electric motor and an electric generator, a power transmission mechanism for coupling the input and output shafts of the rotational electric device with the input shaft of the transmission device, and an accumulator element for accumulating electrical power supplied by the rotational electric device. Moreover, it also comprises means for determining gear change instructions for the transmission device; means for disengaging a clutch when a gear change instruction is determined; and means for controlling the rotation of said rotational electric device in such a manner that the rotational speed of the input shaft of the transmission device assumes a target rotational speed required for a gear changing operation.

Consequently, according to the present invention, the rotational speed of the input shaft of the transmission device is made to converge to a target rotational speed and rapidly come within the synchronization range of the target gear, by means of rotational control of the rotational electric device, and hence the synchronous time can be shortened and the load on the synchronous mechanism can be reduced.

BEST MODE FOR CARRYING OUT THE INVENTION

Figure 1:
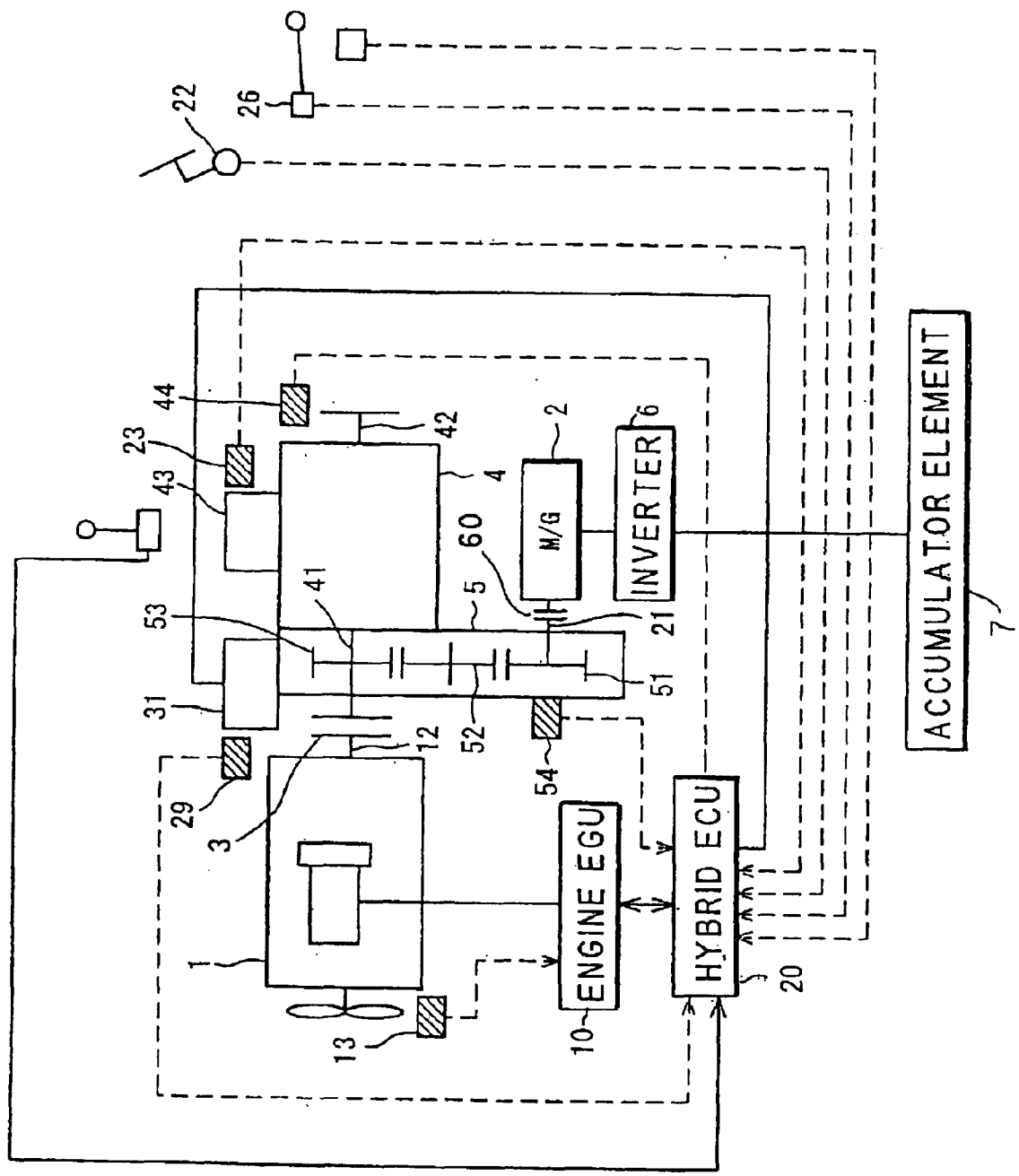
FIG. 1 is a system overview showing an embodiment of this invention.

As shown in FIG. 1, the power train of a vehicle comprises: an engine 1, a transmission 4 (transmission device), and a clutch 3 interposed between the output shaft 12 (crank shaft) of the engine 1 and the input shaft 41 of the transmission 4.

The output of the engine 1 is transmitted via the clutch 3 to the input shaft 41 of the transmission 4, and during travel of the vehicle, it is further transmitted from the output shaft 42 of the transmission 4, via a propeller shaft, differential gears, and drive shafts, to the left and right-hand wheels of the vehicle.

The engine 1 is constituted by a diesel engine or CNG engine (using compressed natural gas as a fuel). The output of the engine 1 is controlled by an electronic engine control unit (ECU) 10, as described hereinafter.

The clutch 3 is caused to engage and disengage by a clutch actuator 31, and the transmission 4 performs gear changing by means of a gear shift actuator 43 whilst the clutch 3 is engaged/disengaged, on the basis of a gear change command from the operator, as described hereinafter. The transmission 4 is a transmission device with a clutch, which performs a gear change operation by means of a gear shift actuator 43 on the basis of a gear change operation signal from a change lever unit 23 which issues a gear position command corresponding to the position of a change lever for gear changing which is operated by the driver.

The power train of the vehicle further comprises a motor generator 2, a power transmission mechanism 5 for coupling the input and output shaft 21 of the motor generator 2 with the input shaft 41 of the transmission 4, and a motor clutch (second clutch) 60 for engaging/disengaging the motor generator 2 with the power transmission mechanism 5.

The motor generator 2 uses a permanent magnet type synchronous electric motor (IPM synchronous motor). The motor generator 2 is connected to the accumulator element 7 via an inverter 6.

The inverter 6 converts the stored electrical power (DC power) of the accumulator element 7 into AC power and supplies it to the motor generator 2, which is driven as an electric motor. The inverter 6 also converts power generated by the motor generator 2 (AC power) into DC power and stores it in the accumulator element 7.

In the accumulator element 7, in order to generate braking energy efficiently and rapidly, without causing waste, an electric double-layer capacitor is used, which can readily guarantee the output density required with respect to the tolerable weight of the vehicle battery.

The power transmission mechanism 5 is constituted by a drive gear 51 coupled to the input/output shaft 21 of the motor generator 2, a driven gear 53 coupled to the input shaft 41 of the transmission 4, and an idle gear 52 which meshes with the aforementioned gears.

The output rotation of the motor generator 2 is geared down by means of the power transmission mechanism 5 and transmitted to the input shaft 41 of the transmission 4. When the vehicle is regenerating energy, the rotation of the input shaft 41 of the transmission 4 is geared up by means of the power transmission mechanism 5 and transmitted to the input shaft 21 of the motor generator 2, thereby performing an electrical power generating action.

A hybrid ECU 20 is provided in order to control the aforementioned clutch 3, transmission 4, inverter 6, engine ECU 10, and so on.

The hybrid ECU 20 is input with various signals from: the change lever unit 23 which generates a gear position command corresponding to the position of the change lever for changing gear; an accelerator opening sensor 22 which detects the amount by which the accelerator pedal is depressed (the accelerator demand amount); a brake sensor 26 which detects the amount by which the brake is operated (brake demand amount); a sensor 44 which detects the output revolution speed of the transmission 4; a sensor 54 which detects the gear revolution speed in the power transmission mechanism 5 (transmission 4 input revolution speed sensor); a clutch position sensor 29 which detects engagement/disengagement of the clutch 3; and (although not illustrated in the drawings), a gear position sensor which detects the shift position of the transmission 4, and a meter which detects the stored charge (SOC) of the accumulator element 7, and the like. Furthermore, it is also supplied with a detection signal from the engine revolution sensor 13 which is input to the engine ECU 10.

The hybrid ECU 20 controls the clutch actuator 31, gear shift actuator 43 and inverter 6 on the basis of the various signals described above and information signals from the engine ECU 10, and it also sends engine output request signals to the engine ECU 10.

Moreover, the hybrid ECU 20 and the engine ECU 10 are connected in a bi-directional fashion by means of communications control means, in such a manner that various types of co-operative control can be performed, as described hereinafter.

The details of the control performed by the hybrid ECU 20 are now described.

Figure 2:
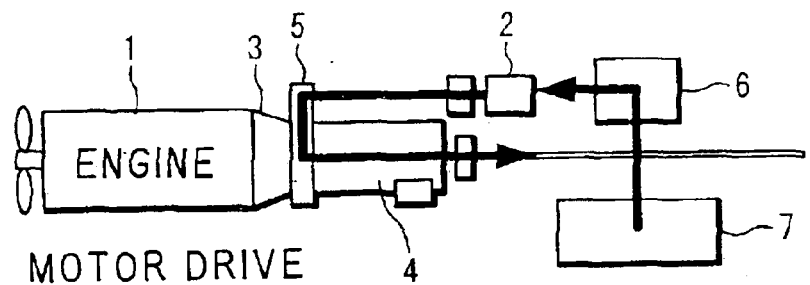
FIG. 2 is an explanatory diagram of the operation of the aforementioned system.

When the vehicle is accelerating or running under the output of the motor generator 2 only, then it controls the inverter 6 in such a manner that an output corresponding to the operational amount of the accelerator is obtained from the motor generator 2, in a state where the clutch 3 is disengaged. The output of the motor generator 2 is transmitted via the power transmission mechanism 5 to the input shaft 41 of the transmission 4, as shown in FIG. 2, and the rotation is transmitted from the output shaft 42 of the transmission 4 to the propeller shaft.

Figure 3:
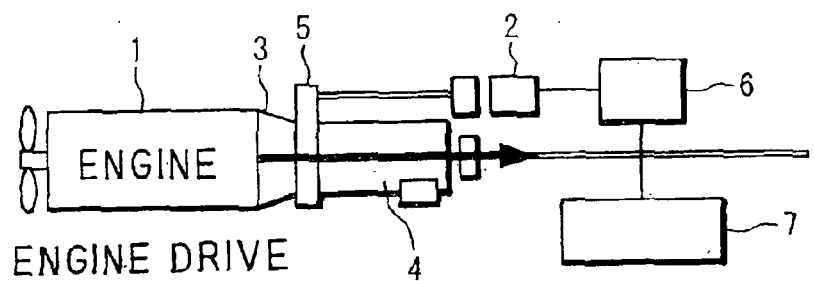
FIG. 3 is an explanatory diagram of the operation of the aforementioned system.

When the vehicle is traveling under the output of the engine 1 only, then an output request signal is sent to the engine ECU 10, and the operation of the motor generator 2 is halted, in a state where the clutch 3 is engaged. The engine ECU 10 controls the amount of fuel supplied to the engine 1 in such a manner that an output corresponding to the amount of operation of the accelerator is obtained, and this output of the engine 1 is transmitted via the clutch 3 to the input shaft 41 of the transmission 4, as shown in FIG. 3, and then from the output shaft 42 of the transmission 4 to the propeller shaft.

Figure 4:
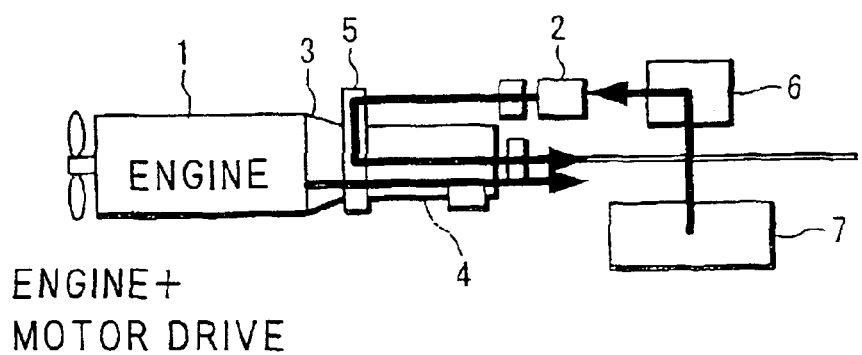
FIG. 4 is an explanatory diagram of the operation of the aforementioned system.

If the output of the motor generator 2 and the output of the engine 1 are to be used in combination during travel of the vehicle, then the inverter 6 is controlled such that, with the clutch 3 in an engaged state, an output request signal is sent to the engine ECU 10, and output from the motor generator 2 also can be obtained. The output of the motor generator 2 is transmitted to the input shaft 41 of the transmission 4 via the power transmission mechanism 5, as illustrated in FIG. 4, and then passes via the current transmission gear and is transmitted from the output shaft 42 of the transmission 4 to the propeller shaft 49, together with the output supplied from the engine 1 via the clutch 3.

Figure 5:
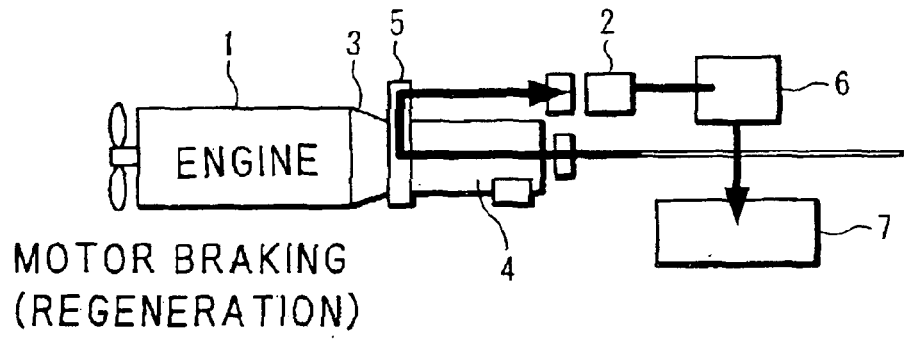
FIG. 5 is an explanatory diagram of the operation of the aforementioned system.

When the vehicle is braking, provided that it is possible to store charge in the accumulator element 7, the inverter 6 is controlled in such a manner that the motor generator 2 is caused to generate electrical power from the regenerated braking force which accompanies the braking action. The rotation of the vehicle wheels is transmitted from the propeller shaft, via the output shaft 42 of the transmission 4, to the input shaft 41 thereof, and then via the power transmission mechanism 5, to the input/output shaft 21 of the motor generator 2, as illustrated in FIG. 5. Thereby, regenerated electricity is created by the motor generator 2 and this electrical power passes via the inverter 6 and is used to charge up the accumulator element 7. In other words, the energy of the vehicle when decelerating is converted to electrical energy by the electrical generation process of the motor generator 2 and is recovered in the accumulator element 7. The shortfall in the brake demand amount can be made up by braking force from electronically control brakes (not illustrated), or the like.

Figure 6:
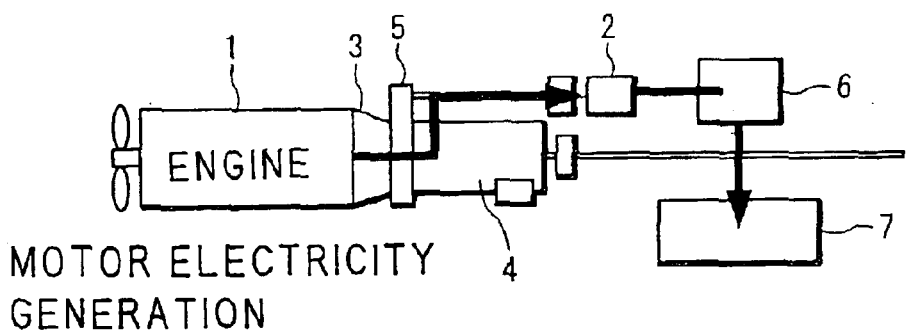
FIG. 6 is an explanatory diagram of the operation of the aforementioned system.

When charging up the accumulator element 7 whilst the vehicle is stationary, the clutch 3 is engaged with the transmission 4 set to neutral. As illustrated in FIG. 6, the rotation of the engine 1 is transmitted from the clutch 3 to the input shaft 41 of the transmission 4, the power transmission mechanism 5, and the input/output shaft 21 of the motor generator 2. Consequently, the motor generator 2 generates electricity due to the output of the engine 1, and this electrical power charges up the accumulator element 7.

Figure 7:
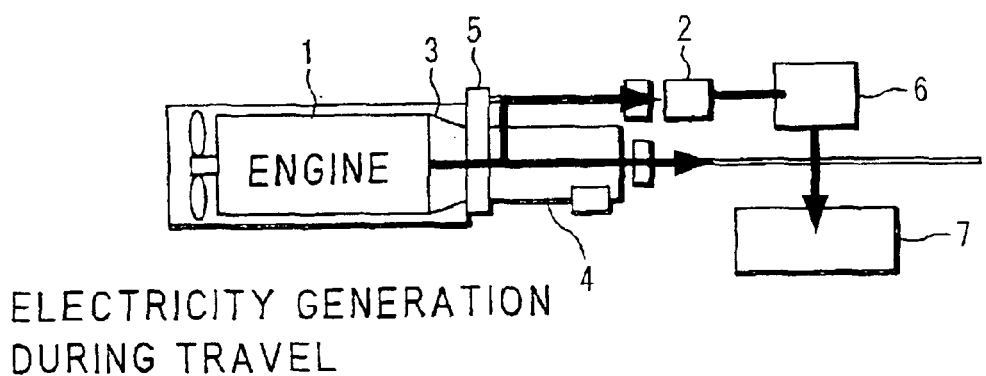
FIG. 7 is an explanatory diagram of the operation of the aforementioned system.

In order to charge up the accumulator element 7 when the vehicle is travelling under the output of the engine 1 only (see FIG. 3), the motor generator 2 is caused to operate as an electric motor. As illustrated in FIG. 7, the output of the engine 1 is transmitted via the clutch 3 to the input shaft 41 of the transmission 4, and then transmitted via the output shaft 42 of the transmission 4 to the propeller shaft 49, as well as being transmitted via the power transmission mechanism 5 to the input/output shaft 21 of the motor generator 2.

Although the hybrid ECU 20 generates the required driving force by means of the motor generator 2 only, by disengaging the clutch 3, when the vehicle is accelerating or running as described above, if the amount of electrical charge stored in the accumulator element 7 has declined, then it causes efficient operation to be performed by adding the output of the engine 1 to the driving force.

Figure 10:
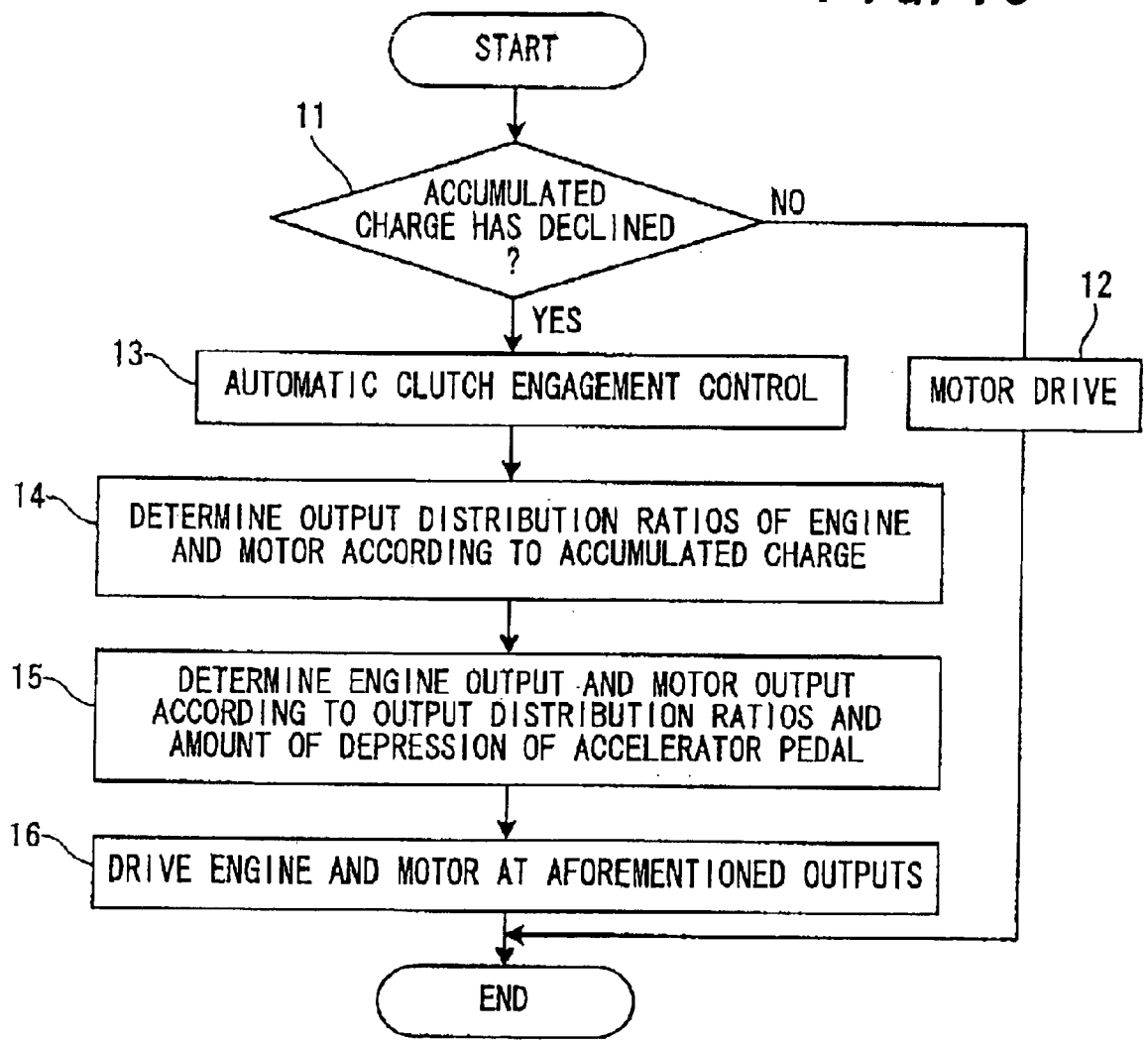
FIG. 10 is a flowchart describing the control procedure in the aforementioned system.

FIG. 10 is a flowchart for this control procedure, which is executed at prescribed control intervals in the hybrid ECU 20.

At step 11, it is determined whether or not the amount of electrical charge stored in the accumulator element 7 is at or below a prescribed value. If the result of this judgement is "no", in other words, if the amount of accumulated charge is sufficient, then the procedure advances to step 12, and the vehicle is driven by means of the output of the motor generator 2 only, with the clutch 3 in a disengaged state. In this case, the inverter 6 is controlled in such a manner that an output corresponding to the amount of operation of the accelerator is obtained from the motor generator 2.

In step 11, if the accumulated charge is at or below the prescribed value, then the procedure advances to steps 13–16.

Figure 9:
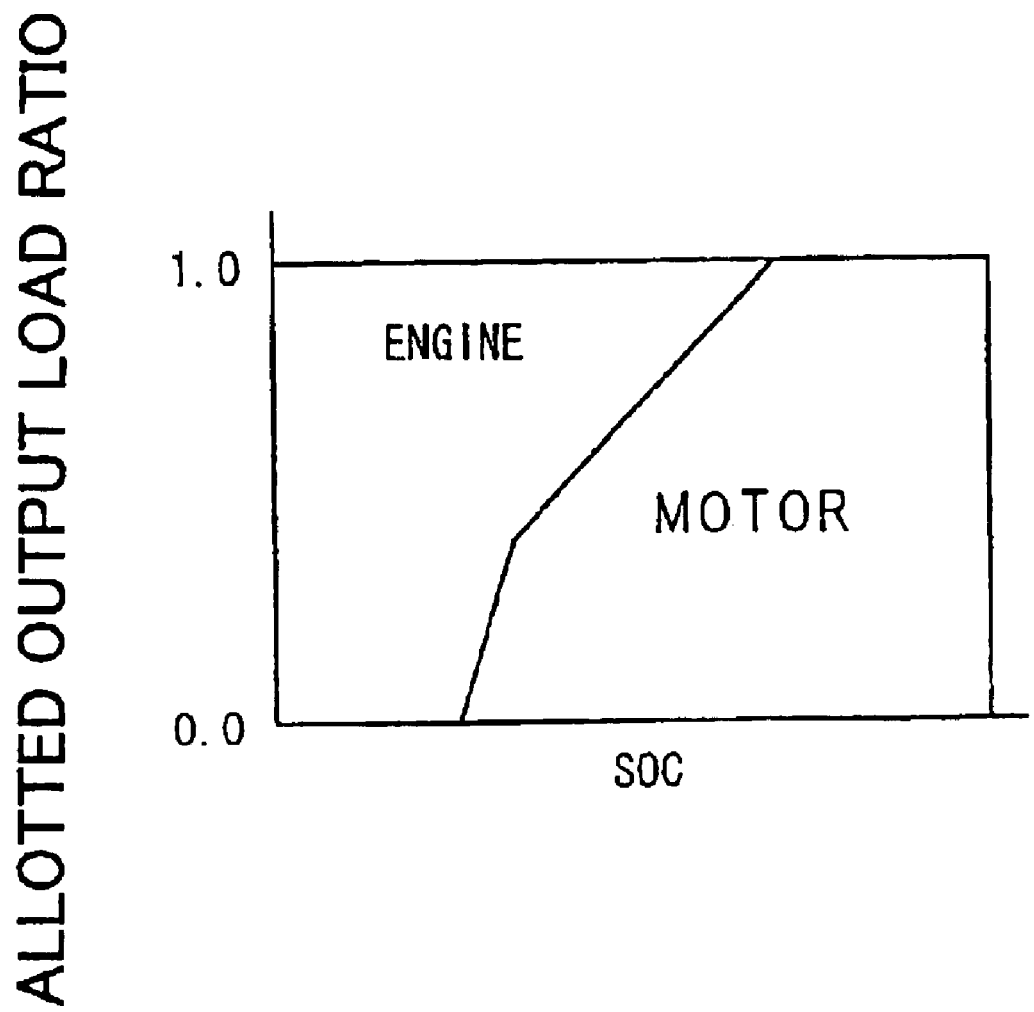
FIG. 9 is a map showing the output distribution of an engine and motor in the aforementioned system.

In step 13, the clutch 3 is engaged to assume a state wherein power can be transmitted from the engine 1. Thereupon, at step 14, the output distribution ratio of the engine 1 and the output distribution ratio of the motor generator 2 are determined from the map in FIG. 9, on the basis of the accumulated charge in the accumulator element 7.

This map specifies distribution ratios for the output of the engine 1 and the output of the motor generator 2, taking the accumulated charge (SOC) in the accumulator element 7 as a parameter. The greater the accumulated charge, the greater the output distribution of the motor generator 2, and the smaller the accumulated charge, the greater the output distribution ratio of the engine 1.

At step 15, the actual output of the engine 1 and output of the motor generator 2 are determined on the basis of the distribution ratios thus determined and the current amount of operation of the accelerator. Thereupon, at step 16, an output request signal corresponding to the distributed output of the engine 1 is sent to the engine ECU 10, and the inverter 6 is controlled in such a manner that the distributed output is obtained from the motor generator 2.

In this way, if the accumulated charge (SOC) in the accumulator element 7 is sufficient, then the vehicle is accelerated or driven by means of the output of the motor generator 2 only, with the clutch 3 in a disengaged state.

On the other hand, if the electrical power is consumed by the driving operation of the motor generator 2 and the amount of accumulated charge has declined to a prescribed value or below, then the clutch 3 is engaged and supplementary output is provided from the engine 1, thereby making it possible to expand the operational range of the motor generator 2 whilst satisfying the required driving characteristics of the vehicle. As the accumulated charge declines, the output load on the motor generator 2 is reduced, and hence the accumulator element 7 is prevented from discharging completely.

In an operational state where the vehicle is being driven by the output of the engine 1 (see FIG. 3), a gear change operation is performed by the gear shift actuator 43 on the basis of a gear change operation signal from the change lever unit 23 which generates a gear position command corresponding to the position of the change lever for changing gear operated by the driver, but since the friction and inertia of the power transmission mechanism 5 and motor generator 2 act upon the input shaft 41 of the transmission 4 in this situation, there is a great load on the synchro mechanism during gear changing, and the gear change time (synchro time) becomes long.

Therefore, in this invention, in order to shorten the gear changing operation, the hybrid ECU 20 controls the rotation of the input shaft 41 by means of the motor generator 2 during gear changing, thereby assisting the synchro operation of the transmission 4.

Figure 8:
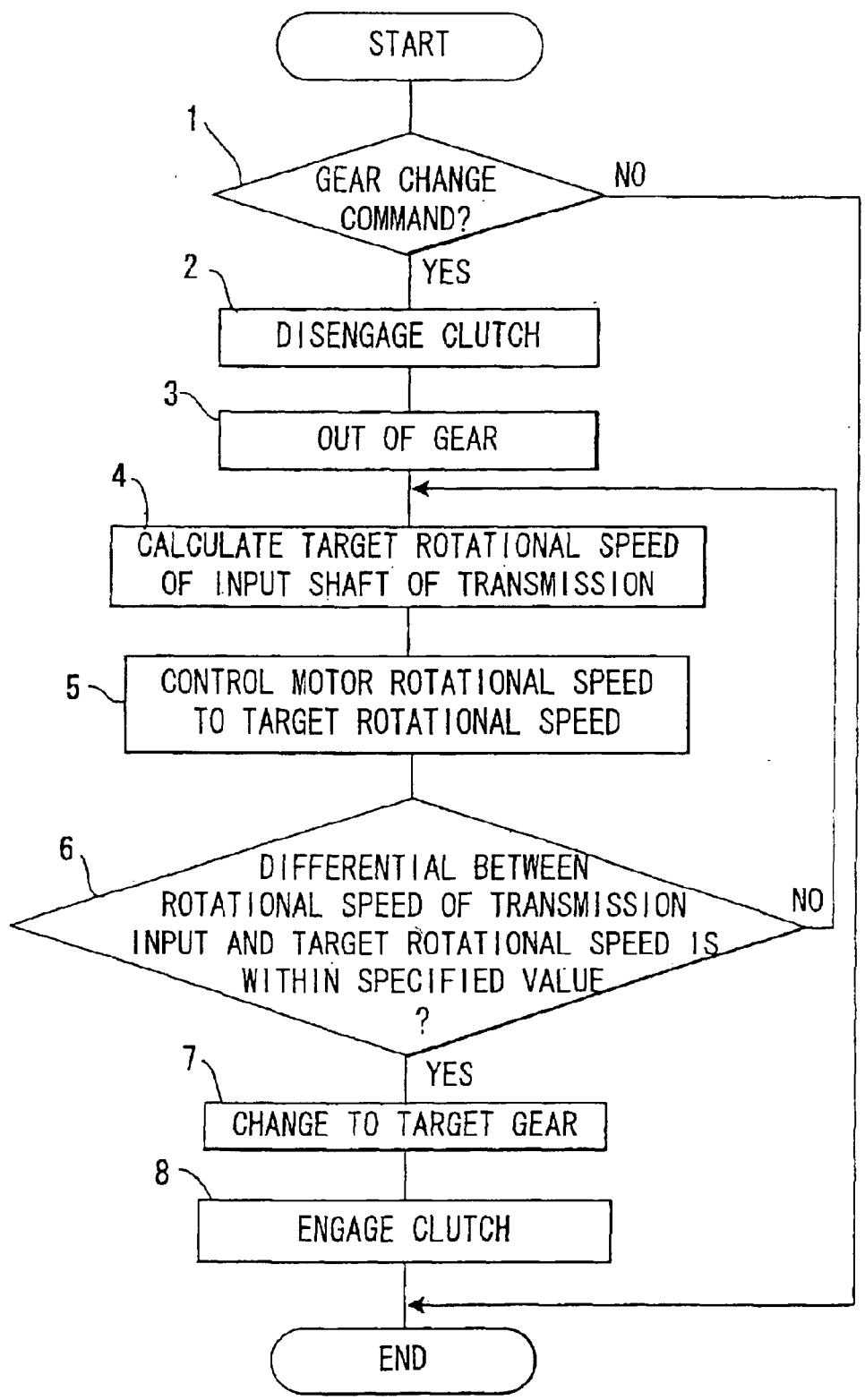
FIG. 8 is a flowchart describing the control procedure in the aforementioned system.

This control operation is now described with reference to the flowchart in FIG. 8.

Firstly, in step 1, it is determined whether or not a gear change command (change of gear position command) has been issued, on the basis of the gear position command from the change lever unit 23. If the result of this judgement is "no", then the procedure advances to END.

If the judgement at step 1 is "yes", in other words, if a gear change command has been issued, then the processing in step 2–step 8 is performed, sequentially.

In step 2 and step 3, the clutch 3 is disengaged and the transmission 4 is set to neutral (out of gear).

In step 4, a target rotational speed for the input shaft 41 of the transmission 4 is determined from the target gear ratio corresponding to the gear position command of the change lever unit 23 and the output rotation speed of the transmission 4 (detection signal from the rotation sensor 44).

Thereupon, in step 5, the rotation of the motor generator 2 is controlled in such a manner that the rotational speed of the input shaft 41 of the transmission 4 (as determined on the basis of the detection signal from rotation sensor 54) matches the target rotational speed.

In step 6, it is determined whether or not the rotational speed of the input shaft 41 of the transmission 4 comes within the synchronization range corresponding to the target rotational speed. If the result of this judgement is "yes", then the procedure advances to step 7 and step 8, wherein the transmission is put into the target gear and the clutch 3 is engaged, whereupon, after engagement of the clutch 3, the rotational control of the motor generator 2 is terminated.

In this way, in gear change control of the transmission 4, by controlling the rotation by means of the motor generator 2, the rotational speed of the input shaft 41 of the transmission 4 can be made to converge rapidly to the synchronization range corresponding to the target rotational speed, thus allowing major advances to be made in shortening the synchro time and reducing the load on the synchro mechanism.

Next, the control for engaging and disengaging the second clutch 60 interposed between the motor generator 2 and drive mechanism 5 is described.

Figure 11:
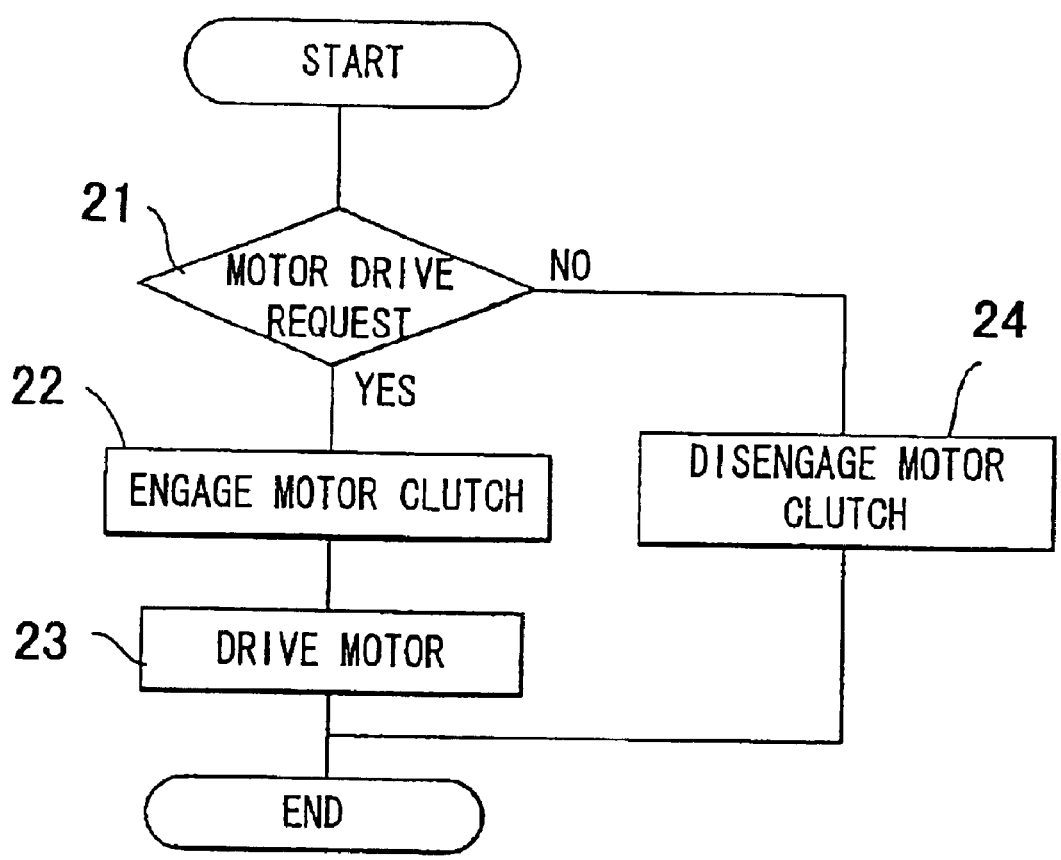
FIG. 11 is a flowchart describing the control procedure in the aforementioned system.

FIG. 11 is a flowchart for controlling the second clutch, which is executed at prescribed control intervals in the hybrid ECU 20.

In step 21, it is determined whether or not there is a motor generator 2 drive request. If the result of this judgement is "yes", then the procedure advances to step 22, and the second clutch 60 (motor clutch) is engaged. At step 23, the motor generator 2 is driven and caused to produce output rotation.

The motor generator 2 drive request is not limited to cases where the transmission 4 is performing a gear change operation as described above, but rather is also output, for instance, when the vehicle is to be driven by the aforementioned motor generator 2 alone, when the vehicle is to be driven by a combination of the engine 1 and the motor generator 2, when electrical power is to be generated by driven the motor generator 2 by means of the engine, or when the motor generator 2 is to be caused to generate electrical power in order to regenerate the kinetic energy of the vehicle when decelerating.

On the other hand, when there is no drive request, in other words, when the judgement at step 21 is "no", then at step 24, the second clutch 60 is disengaged.

In this way, by disengaging the second clutch 60 in advance when operation of the motor generator 2 is to be halted, the load on the drive system is reduced in accordance with the inertial weight and friction of the motor generator 2, when the vehicle is travelling under the output of the engine 1 alone, and hence it is possible to promote improved fuel consumption of the engine 1. Furthermore, when performing gear change operations of the transmission 4 according to the driver's operations, by engaging the second clutch 60, it is possible to assist the synchro operation by means of the motor generator 2.

It is also possible for the second clutch 60 to be interposed between the input shaft 41 of the transmission 4 and the power transmission mechanism 5.

INDUSTRIAL APPLICABILITY

The present invention is a parallel hybrid drive system which can be used as a drive source for a vehicle.

What is claimed is:

1. An improved hybrid system for a vehicle that includes an engine having an output shaft, a transmission device for changing the speed of rotation of an input shaft thereof and transmitting said rotation to vehicle wheels via an output shaft thereof, a clutch for engaging/disengaging the output shaft of the engine with/from the input shaft of the transmission device, a rotational electric device serving as an electric motor and an electric generator, a power transmission mechanism for coupling an input/output shaft of the rotational electric device with the input shaft of the transmission device, and an accumulator element for accumulating electrical power supplied by the rotational electric device, wherein the improvement comprises:

means for determining gear change instructions for the transmission device;

means for disengaging the clutch when a gear change instruction is determined; and means for controlling rotation of said rotational electric device, transmitted to the input shaft of said transmission device and geared down by said power transmission mechanism, in such a manner that the rotational speed of the input shaft of the transmission device assumes a target rotational speed required for the gear changing operation.

2. The improved hybrid system for a vehicle according to claim 1, wherein said control means determines a target rotational speed for the input shaft of the transmission device from the target gear based on the gear change instruction and the rotational speed of the output shaft of the transmission device, and controls the rotational speed of said rotational electric device in such a manner that the rotational speed of the input shaft of the transmission device approximately matches this target rotational speed.

3. The improved hybrid system for a vehicle according to claim 1, wherein a second clutch is interposed between said rotational electric device and the power transmission mechanism, said control means causing the second clutch to be disengaged when there is no drive request for said rotational electrical device.

* * * * *

UNITED STATES PATENT AND TRADEMARK OFFICE
CERTIFICATE OF CORRECTION

PATENT NO. : 6,884,199 B2
DATED : April 26, 2005
INVENTOR(S) : Ikurou Notsu et al.

It is certified that error appears in the above-identified patent and that said Letters Patent is hereby corrected as shown below:

<u>Title page,</u>
Insert Item -- [30]   Foreign Application Priority Data
October 16, 2000 [JP]   Japan .... 2000-315753
October 16, 2000 [JP]   Japan .... 2000-315757 --

Signed and Sealed this

Twenty-first Day of June, 2005

JON W. DUDAS
*Director of the United States Patent and Trademark Office*